Oct. 16, 1962 A. J. DESSLER 3,058,344
FLUID DETECTOR ARRANGEMENT
Filed July 17, 1958 3 Sheets-Sheet 1
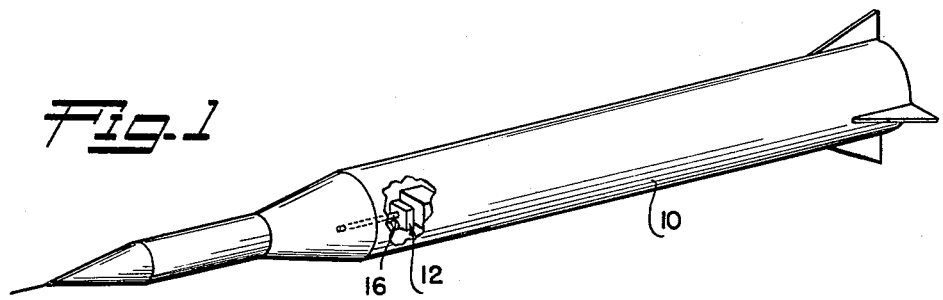
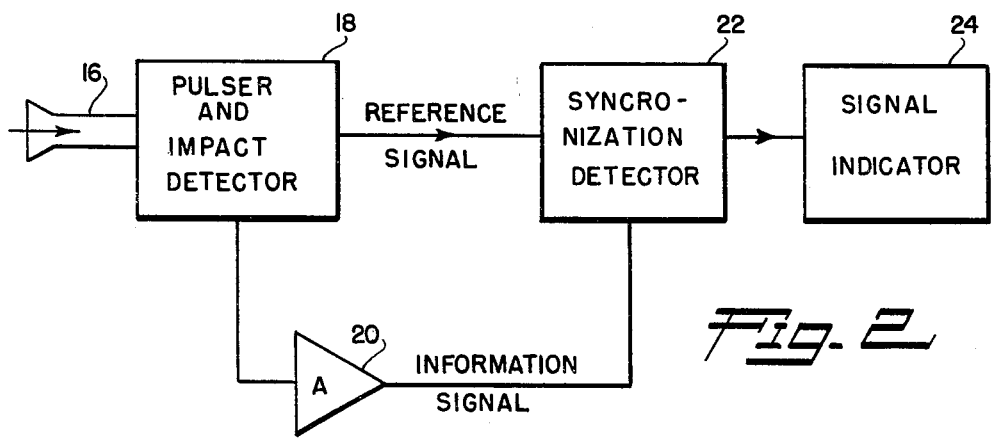
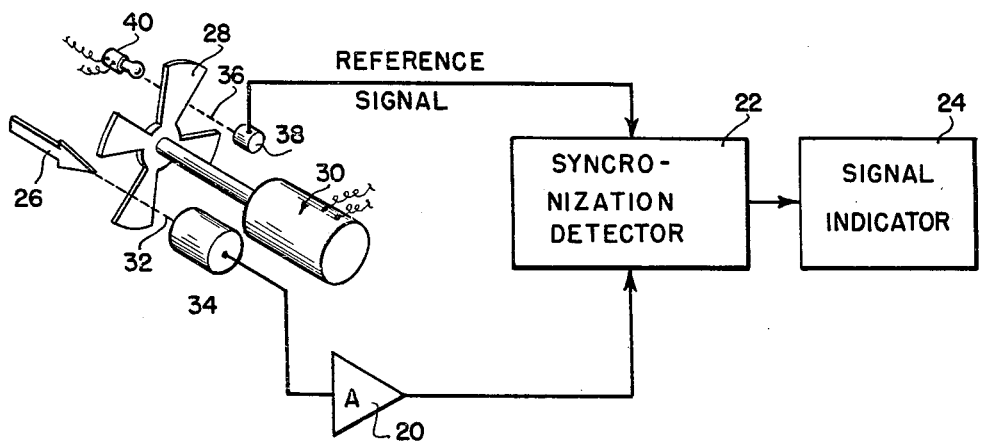
INVENTOR.
ALEXANDER J. DESSLER
BY
Agent Oct. 16, 1962  A. J. DESSLER  3,058,344
FLUID DETECTOR ARRANGEMENT
Filed July 17, 1958  3 Sheets-Sheet 2

INVENTOR.
ALEXANDER J. DESSLER
BY
George Sullivan
Agent

United States Patent Office 3,058,344
Patented Oct. 16, 1962

3,058,344
FLUID DETECTOR ARRANGEMENT
Alexander J. Dessler, Palo Alto, Calif., assignor to Lockheed Aircraft Corporation, Burbank, Calif.
Filed July 17, 1958, Ser. No. 749,263
8 Claims. (Cl. 73—178)

The present invention realtes to fluid detector arrangements and more particularly to fluid detector arrangements in which a fluid is interrupted to produce fluid impulses for detection.

In the preferred embodiment, the properties of a fluid, e.g. density, velocity, relative direction of motion, may be determined by intercepting the fluid to produce a fluid beam or stream and interrupting the fluid stream periodically to produce fluid impulses wherein at least a portion of the impulses are detected to determine the properties of the fluid. Preferably, a detector is disposed in the path of the impulses and is responsive to the momentum of the impulses whereby the output is a function of the density and velocity ($\rho V^2$). Detectors disposed adjacent the normal or predetermined direction of motion of a stream of impulses are responsive to changes or deviations in the path of the impulses which, for example, would result from the pitch or yaw of a vehicle traveling through the fluid and intercepting a portion of the fluid to produce a fluid stream.

In a preferred embodiment, a fluid detector is disposed in a high velocity vehicle such as a missile. A missile traveling through the upper atmosphere, for example, may intercept the air to form a beam of gas particles and introduce the beam into the detector chamber for analysis. The beam is interrupted periodically to produce a beam of impulses having momentum which when striking a detector such as a microphone or bolometer produces an alternating signal output. The output is amplified and detected further by a synchronization or lock-in detector, often referred to as a phase sensitive or product detector, having a reference signal input. The signal output of the synchronization detector is a D.C. signal whose level or amplitude is directly proportional to $\rho V^2$. Therefore, if the vehicle velocity is known, the output signal will be a direct measure of the atmospheric density. Likewise, if the density of the atmosphere through which the vehicle is moving is known, the output signal is then a measure of velocity.

In an alternate embodiment, the change in direction of heading relative to direction of motion of a missile for example, is determined by detecting the change in the path of an intercepted beam of gas particles which has been interrupted to form impulses. In one arrangement of the alternate embodiment, a beam is provided for each impact detector, however, a single beam would be sufficient. Preferably, the difference between opposing impact detectors determines the direction of pitch or yaw relative to the direction of motion and the intensity of the resulting difference output is a function of the magnitude of the angle of pitch and/or yaw.

An object, therefore, of the present invention is the provision of a detector for determining properties of fluids.

Another object is to provide a detector for intercepting fluid to produce a fluid stream, interrupt the fluid stream to produce a beam of fluid impulses and detect the impulses to determine properties of the fluid.

A further object of the invention is the provision of a body member for travel through a fluid, the interception of the fluid flow past the body to produce a fluid stream, and the interruption of the stream to produce impulses for detection of the properties of the fluid.

Still another object is to provide a detector of fluids for supersonic vehicles traveling in the upper atmosphere.

A still further object is to provide a detector for sensing turning of a vehicle relative to its direction of motion through a fluid.

Other objects and features of the invention will become apparent to those skilled in the art as the disclosure is made in the following detailed description of a preferred embodiment of the invention as illustrated in the accompanying sheets of drawings in which:

FIGURE 1 is a perspective view of a preferred embodiment of the invention enclosed in a high velocity vehicle;

FIGURE 2 is a block diagram of the preferred embodiment of the invention;

FIGURE 3 is a schematic diagram partially in block form illustrating a preferred embodiment of the invention;

Figure 4:
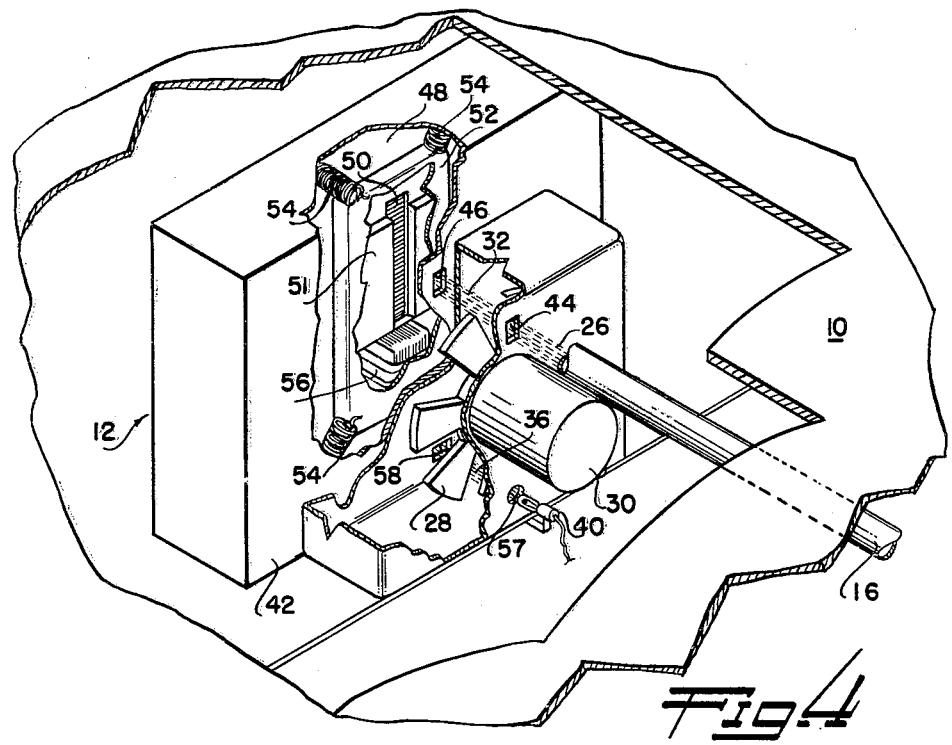
FIGURE 4 is a perspective view of the apparatus in the preferred embodiment partially broken away in order to view the internal construction thereof.

Referring now to the drawing wherein like reference characters designate like or corresponding parts throughout the several views there is shown in FIGURE 1 a preferred embodiment of a missile or high velocity vehicle 10 in which fluid detector apparatus 12 has been mounted. The fluid detector apparatus 12 includes a tube 16 providing an opening through the exterior surface of the missile. Tube 16 admits the surrounding fluid or ambient gas particles of the upper atmosphere through which the missile 10 is traveling into the detector apparatus. The fluid detector 12 determines certain properties of the gas particles in the upper atmosphere during the time of travel of the missile 10 as the gas particles are introduced in the form of a stream or beam by the tube 16.

In FIGURE 2, the block diagram of the fluid detector includes the entrance tube 16 shown schematically, for intercepting a fluid and introducing it into a pulser and impact detector 18 which is described more fully later on. Preferably, a reference signal is derived from the pulser. This reference signal should be of constant amplitude and of the same form or shape as the signal output of the impact detector. The output of the impact detector is an information signal from which the properties of the fluid being analyzed are determined. Since the output of the impact detector is an A.C. signal in the micro-volt level, it is coupled to an amplifier 20 for amplification before coupling into the synchronization detector 22.

The information signal from the amplifier 20 and the reference signal from the pulser or interrupter are coupled into the synchronization detector 22 which provides a D.C. signal having an output level proportional to the product of the reference and the information signal or a D.C. signal whose level is directly proportional to the information signal. While any phase or lock-in detector having an output proportional to the product, where the reference and information signal are in phase, may be utilized in this invention, a typical example of one such detector may be found in "Electronics" for February 1954, vol. 27, part 1, page 189, reference 10. The current in the meter is proportional to $E_1E_2 \cos \theta$, and the phase adjustment is made by the dual potentiometer in the phase shift circuit. In the preferred arrangement, for determining the properties of the fluid being analyzed, the information signal is directly proportional to $\rho V^2$. The D.C. signal output of the synchronization detector 22 is coupled to the signal indicator 24 for displaying the information visually or audibly, or both. If the velocity is known, the density is easily determined.

FIGURE 3 illustrates a preferred arrangement for interrupting the fluid stream introduced by the tube 16. A beam or stream of gas particles, illustrated by the arrow 26, is interrupted periodically by the blades of a chopper 28 which is coupled to and driven by a motor 30. The interrupted stream produces fluid impulses 32 which strike an impact detector 34 to produce an A.C. signal which is proportional to the momentum of the impulses.

The reference signal in the preferred embodiment of FIGURE 3 is derived from an interrupted light beam 36 striking a photo sensitive detector 38 to produce an A.C. signal which is preferably adjusted to be in phase if not so with the amplified information signal. In other words, in the conventional phase sensitive product detector the output D.C. signal is directly proportional to $V_{mike}V_{ref} \cos \theta$, where $V_{mike}$ is the output voltage from the microphone, $V_{ref}$ is the reference voltage (a constant) and $\theta$ is the phase angle between $V_{mike}$ and $V_{ref}$. In the present case, $\theta$ is adjusted to zero (0°) degrees and $\cos \theta$ is accordingly equal to one (1). Preferably, the amplitude of the reference signal is constant and of the same form or shape as the information signal. The interrupted light beam 36 is produced by the chopping action of the blades of the chopper 28 passing between the light source 40 and the photo sensitive detector 38. The operation of the synchronization detector 22 and signal indicators are the same as described in connection with FIGURE 2.

In the operation of the preferred embodiment of FIGURE 3, a beam 26 which is intercepted by a tube 16, or the like, by the motion of a supersonic vehicle samples the stationary ambient gas particles of the upper atmosphere. The pulser or interrupter shown in FIGURE 3 converts the beam or stream into an alternating beam of impulses 32. A typical interrupting speed would be about 150 cycles per second although the interrupter can be operated to produce an alternating beam in the range of 20 and 2000 cycles or pulses per second. Further, the interrupter may take the form of vibrating reeds or other means for interrupting a gas beam at a preferred rate.

The impact detector 34 may consist of a sensitive microphone or bolometer or heat detector. The microphone may be of the sensitive ribbon type in which the ribbon consists of a strip of aluminized Mylar film approximately .00025 in. in thickness mounted between pole pieces of a magnet. When the aluminized Mylar is moved by the impact of the gas particles, a voltage is developed due to the motion of the conductor or strip in the magnetic field of the magnet. Other types of sensitive microphones or sensitive voltage bolometers may be used. Bolometers may preferably be used to provide improved performance because of the absence of moving parts which may be affected by vibration. The output of the impact detector 34 is amplified by the amplifier 20 and coupled into the synchronization detector 22 along with the reference signal from the photo sensitive detector 38 to produce a D.C. signal which is proportional to the density and the square of the velocity of the interrupted fluid stream of impulses 32. This signal is displayed by the signal indicator 24.

In FIGURE 4, the fluid detector apparatus 12 is viewed through a cut-away portion of the missile exterior surface and detector casing 42. The fluid stream 26 intercepted by the tube 16 is coupled into the interior of the fluid detector casing 42 through an aperture 44. The fluid beam passing through the aperture 44 is interrupted by the blades of the chopper 28 to produce the alternating beam of impulses 32 which continue along their direction of motion through the aperture 46 in the intermediate wall of the casing 42 which separates a microphone chamber 48 from the interrupting chamber. The fluid impulses 32 passing through the aperture 46 continue along their line of flight or direction of motion to strike a ribbon 50 supported between the poles of a magnet 51 of an impact detector or microphone 52. As shown, the microphone 52 is shielded mechanically by the shock mounting including coil springs 54 supporting the microphone at each corner of its casing. A microphone transformer 56 is disposed below the ribbon and the remainder of the microphone impact sensitive apparatus.

In a typical embodiment as illustrated in FIGURE 4, the chopper to ribbon separation may be about three (3) centimeters. The velocity of the vehicles considered for use of the invention will always be greater than four (4) kilometers per second ($4 \times 10^5$ cm./sec.), so that the particle transit time from chopper to ribbon is less than $10^{-5}$ second. The total phase shift caused by the transit time, at a 2000 c.p.s. chopper frequency, would be $$10^{-5} \times 2000 \times 360 = 7 \text{ degrees.}$$

At higher velocities (satellites approach $8 \times 10^5$ cm./sec.) the phase shift would be even smaller. Since the cosine of such a small angle does not differ appreciably from one, such velocity changes are of minor importance.

Apertures 57 and 58 are provided for introducing the light beam from the light source 40 into the chamber. The light beam is interrupted to produce the alternating light beam 36 passing into the chamber 48 to strike the photo sensitive element 38 shown in FIGURE 3 producing the alternating electrical reference signal.

Figure 5:
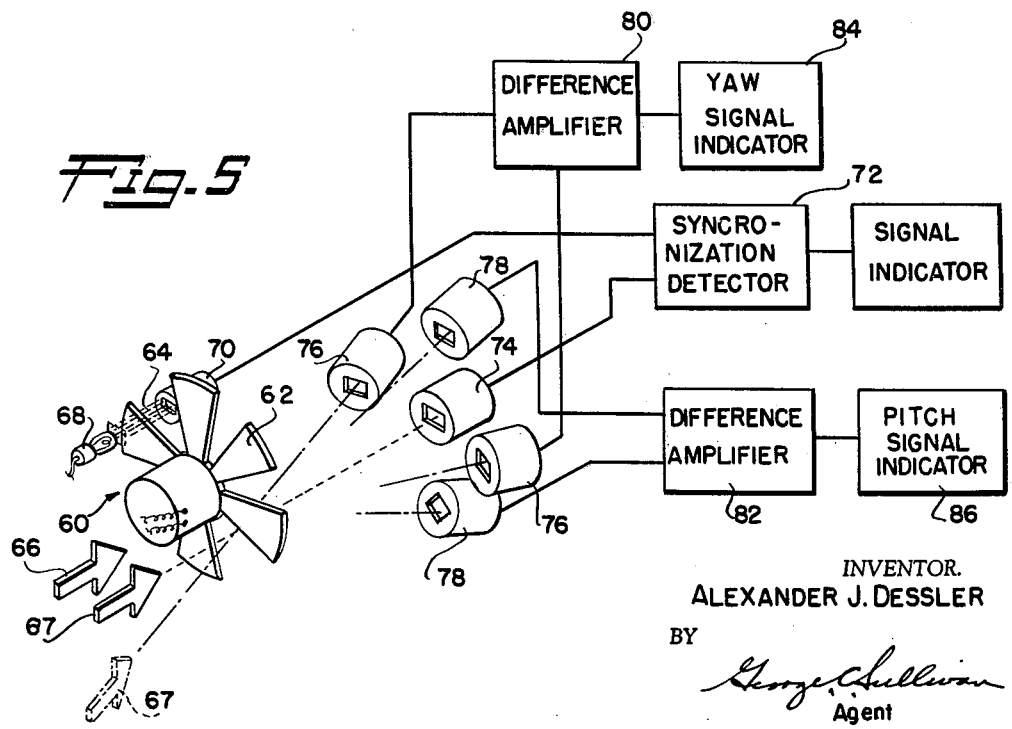
FIGURE 5 is a schematic diagram partially in block form of an alternative embodiment of the invention.
Figure 6:
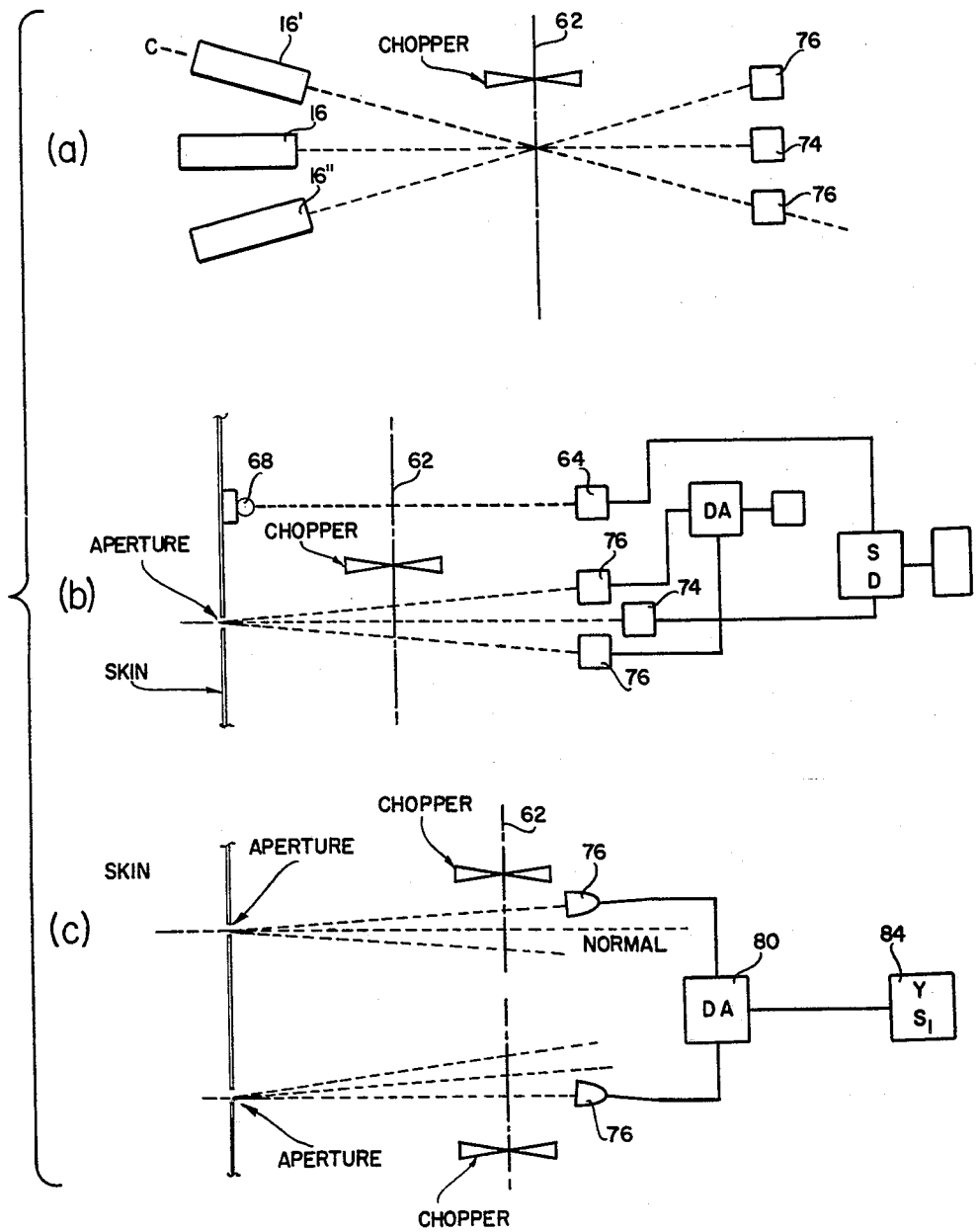
FIGURE 6 is a schematic diagram partly in block form illustrating alternative beam sources in FIGURE 5.

The alternate embodiment illustrated in FIGURE 5 comprises a turn indicator or deviation detector including an interrupter 60 having blades 62 for periodically interrupting a light beam 64 and fluid streams 66 and 67, one of the beams 67 being illustrated in dash-dot lines and in angular relation with the normal beam shown as a dotted line. The fluid streams 66 and 67 may be derived from a multiple tube source as illustrated in FIGURE 6a. The light source is shown by a bulb 68 which may be coupled to a convenient power source along with the motor for the interrupter 60. A light sensitive element 70 detects the light impulses to produce an alternating reference signal which is coupled to a synchronization detector 72 along with an information signal from an impact detector 74 located in the normal line or direction of motion of one of the alternating beams formed from the fluid streams 66 or 67.

In the preferred arrangement, the turn indicator of FIGURE 5 includes the fluid property detector providing a similar function to the system set forth in FIGURE 3. The turn indicator elements include the impact detectors 76 to detect the relative horizontal deviations of a fluid stream, shown as beams having an angular relation to the normal, to provide a signal indicating yaw and impact detectors 78 for detecting relative vertical deviations of a fluid stream to provide a signal which is indicative of the pitch of the vehicle in which the turn indicator is mounted. The output of the impact detectors 76 are coupled to a difference amplifier 80 and the output of the impact detectors 78 are coupled to a difference amplifier 82 to provide respective differential signal outputs which are proportional to or a function of the deviations in horizontal and vertical planes and the yaw and pitch of the vehicle in which the turn indicator is mounted.

The beams shown as dash-dot lines may conveniently be produced by arranging additional tubes around the tube 16 and in angular relationship thereto. When the longitudinal axis of the vehicle coincides with the line of flight, each of the beams striking the yaw detectors, for example, will be of equal amplitude and result in a zero output from the difference amplifier 80. When the vehicle yaws, one of the dash-dot beams will be stronger and a corresponding difference signal appears in the output of amplifier 80. The pitch indication is derived in a similar manner.

In the event the opposing impact detectors 76 and 78, respectively, are insufficient to detect turns which produce streams of impulses between detectors, the detectors may be extended to occupy substantially the complete circle surrounding the fluid streams entering the turn indicator apparatus. Also additional impact detectors may be coupled together in order to occupy the complete circle surrounding the fluid impulses entering the area.

In operation, and referring to FIGURES 6(a) and (b), one or more fluid streams 66—67 entering the turn indicator or detector are interrupted periodically by the blades 62 to produce streams of fluid impulses which in the absence of a turn would pass into the area between the opposing impact detectors 76 and 78. Pitching or turning in any direction causing the fluid streams 66—67 to deviate in direction will produce impulses in a direction causing one of the impact detectors 76 to have a signal output or larger signal output than the other opposing impact detector. Since the outputs are compared in the difference amplifier to produce a signal indicative of yaw or pitch, fluid impulses causing a greater impact on any one of the detectors than its opposing detector produce a signal on the respective indicators 84 and 86. For example, the fluid stream 67 would tend to be directed towards the impact detector 78 upon an increase in pitch of the missile. Since the output of the lower impact detector 78 tends to be smaller or the same, a difference signal would result in the difference amplifier 82 which is coupled to the pitch signal indicator 86 to indicate visually or audibly the change and/or degree of pitch and the direction thereof.

While certain preferred embodiments of the invention have been specifically disclosed it is understood that the invention is not limited thereto, as many variations will be readily apparent to those skilled in the art and the invention is to be given its broadest possible interpretation within the terms of the following claims.

I claim:
1. The method of measuring the density of the gas in the upper atmosphere which comprises intercepting the gas by a vehicle moving through the upper atmosphere to produce a beam of gas particles, interrupting the beam to form gaseous impulses, detecting the impact of at least a portion of the impulses to produce a signal which is a function of the gas density and velocity.

2. The method of detecting deviations of motion of a vehicle through a fluid which comprises intercepting at least a portion of the fluid to form a fluid stream, interrupting the fluid stream to produce fluid impulses, and detecting at least a portion of the fluid impulses including a portion of the fluid impulses deviating from a predetermined direction of motion.

3. The method of detecting deviations of motion of a vehicle through a fluid which comprises intercepting the fluid to form a fluid stream, interrupting the fluid stream to produce fluid impulses, and detecting the energy density of at least a portion of fluid impulses including at least a portion of the fluid impulses deviating from predetermined directions of motion.

4. A fluid detector arrangement which comprises means for intercepting the fluid to produce a fluid beam having a predetermined direction of motion, means in the path of the beam for interrupting it to produce fluid impulses and detector means disposed on opposite sides of said predetermined direction to receive the impulses and responsive to the energy density of the impulses for indicating deviations from said predetermined direction of motion.

5. A fluid detector arrangement comprising: flow means for producing a substantially continuous fluid stream from the fluid to be detected, interrupting means in the path of the fluid stream for forming the fluid stream into fluid impulses, impact sensitive means for intercepting the fluid impulses and producing a voltage proportional to the energy of said impulses, means including said interrupting means for producing a reference signal and detector means responsive to said voltage and said signal for providing a signal which is a function of the velocity and density of said fluid.

6. In combination with a high velocity vehicle having inlet means for intercepting the surrounding fluid to form a fluid stream flowing along a predetermined normal free path; interrupting means for periodically interrupting the fluid stream to produce a beam of fluid impulses and sensing means adjacent the normal free path of the beam responsive to the energy density of the fluid impulses to detect deviations from the normal free path of the impulses resulting from turning of the vehicle relative to its direction of motion.

7. In combination with a high velocity vehicle having inlet means for intercepting the surrounding fluid to form a fluid stream flowing along a predetermined normal free path, interrupting means for periodically interrupting the fluid stream to produce a beam of fluid impulses and opposing sensing means adjacent the normal free path of the beam responsive to the energy density of the fluid impulses and detector means responsive to the difference in energy density of impulses received by opposing sensing means resulting from deviations from the normal free path of the impulses and turning of the vehicle relative to its direction of motion.

8. In combination with a high velocity vehicle adapted for moving through the upper atmosphere, means for intercepting the atmosphere to produce a beam of gas particles, means for producing a reference beam of light, means for interrupting said gas beam and said reference beam to thereby form impulses of light and gas, means responsive to said light impulses for generating an electrical reference signal, means responsive to the impact of said gas impulses for generating an information signal, means for combining said reference signal and said information signal to produce a signal which is a function of the gas density and velocity.

References Cited in the file of this patent

UNITED STATES PATENTS

| | | |
|---|---|---|
| 1,561,655 | MacKenzie | Nov. 17, 1925 |
| 1,655,125 | Baule | Jan. 3, 1928 |
| 1,785,724 | Brant | Dec. 16, 1930 |
| 1,935,445 | Heinz | Nov. 14, 1933 |
| 1,992,991 | Colley | Mar. 5, 1935 |
| 2,869,366 | Nitikman | Jan. 20, 1959 |

FOREIGN PATENTS

| | | |
|---|---|---|
| 566,934 | France | Apr. 24, 1923 |